(12) United States Patent
Hruby et al.

(10) Patent No.: US 8,550,405 B2
(45) Date of Patent: Oct. 8, 2013

(54) SOLAR POWERED SPACECRAFT POWER SYSTEM FOR A HALL EFFECT THRUSTER

(75) Inventors: Vladimir Hruby, Newton, MA (US); Thomas Jaquish, Fort Wayne, IN (US); Antonio Rizzo, Nashua, NH (US); Eric Ehrbar, Brighton, MA (US)

(73) Assignee: Busek Company, Inc., Natick, MA (US)

( * ) Notice: Subject to any disclaimer, the term of this patent is extended or adjusted under 35 U.S.C. 154(b) by 172 days.

(21) Appl. No.: 12/807,222

(22) Filed: Aug. 31, 2010

(65) Prior Publication Data

US 2011/0073714 A1    Mar. 31, 2011

Related U.S. Application Data

(60) Provisional application No. 61/277,766, filed on Sep. 29, 2009.

(51) Int. Cl.
*B64G 1/36* (2006.01)

(52) U.S. Cl.
USPC ............................................. 244/171

(58) Field of Classification Search
USPC ............................................. 244/171
See application file for complete search history.

(56) References Cited

U.S. PATENT DOCUMENTS

| | | | | |
|---|---|---|---|---|
| 4,143,314 | A * | 3/1979 | Gruber | 323/288 |
| 5,604,430 | A * | 2/1997 | Decker et al. | 323/275 |
| 7,394,237 | B2 * | 7/2008 | Chou et al. | 323/299 |
| 7,495,351 | B2 * | 2/2009 | Fein et al. | 290/1 R |
| 2008/0053513 | A1 * | 3/2008 | Palmer | 136/246 |
| 2009/0229656 | A1 * | 9/2009 | Tillotson | 136/251 |
| 2010/0133911 | A1 * | 6/2010 | Williams et al. | 307/82 |
| 2011/0073714 | A1 * | 3/2011 | Hruby et al. | 244/171.1 |

OTHER PUBLICATIONS

Cho, et al., "Novel Full Bridge Zero-Voltage-Transition PWM DC/DC Converter for High Power Applications", IEEE, 1994, pp. 143-149.
Sabate et al., "Design Considerations for High-Voltage, High-Power full-Bridge Zero-Voltage-Switched PWM Converter", APEC 1990, pp. 275-284.
Zhao et al., "Planar Embedded Pick-up Coil Sensor for Integrated Power Electronic Modules", APEC 2004, pp. 945-951.
Hua et al., "Novel Zero-Voltage-Transition PWM Converters", PESC 1992, pp. 55-61.

* cited by examiner

*Primary Examiner* — Tien Dinh
*Assistant Examiner* — Justin Benedik
(74) *Attorney, Agent, or Firm* — Iandiorio Teska & Coleman, LLP

(57) ABSTRACT

A solar powered spacecraft power system including a solar photovoltaic array, an electric propulsion system connected directly to the solar photovoltaic array in parallel with the spacecraft power system; the electric propulsion system including a Hall effect thruster, a thruster power supply for driving the thruster; a sensor for sensing the power output of the solar array and a controller responsive to the power output of the solar array and configured to periodically adjust an operating parameter of the thruster to operate the thruster at the maximum available output power of the solar array including comparing a previous solar array output power level with a later solar array output power level, and incrementing the operating parameter with a positive value if the later is greater and with a negative value if the later is lesser; a solar powered spacecraft power system including a solar photovoltaic array, an electric propulsion system connected directly to the solar photovoltaic array, and a power management and distribution system connected to the solar photovoltaic array for distributing power to one or more bus loads and payloads.

12 Claims, 8 Drawing Sheets

US 8,550,405 B2

SOLAR POWERED SPACECRAFT POWER SYSTEM FOR A HALL EFFECT THRUSTER

RELATED APPLICATIONS

This application claims benefit of and priority to U.S. Provisional Application Ser. No. 61/277,766 filed Sep. 29, 2009 under 35 U.S.C. §§119, 120, 363, 365, and 37 C.F.R. §1.55 and §1.78 incorporated herein by this reference.

FIELD OF THE INVENTION

This invention relates to an improved solar powered spacecraft power system and to spacecraft electric propulsion for a Hall effect thruster.

BACKGROUND OF THE INVENTION

In conventional solar powered spacecraft, power is generated by a solar photovoltaic array (SP) and flows into a power management and distribution (PMAD) system. From there it is distributed to all loads: the bus loads, the payload(s) and in electric propulsion (EP) spacecraft, the EP load such as Hall effect thrusters. A PMAD system is a large, heavy, complex collection of circuits including e.g. filters, batteries, DC/DC converters, isolation circuits and voltage regulators. The EP load may use the largest share of the power when it is operating. This means that the PMAD system must have the capacity to process all the power produced by the SP including power for the EP even though significant amount of the time the PMAD system is servicing only the bus load(s) and payload(s). Thus the PMAD system has to be quite large to supply the required power to the EP on demand and also has the have the means to dissipate (as heat) excess power generated by the SP when the EP is making no demand. The extra size and weight required to perform both these functions is critical in spacecraft design and operation.

There is yet another shortcoming associated with current PMAD systems. The PMAD system may contain peak power tracking or solar array shunt circuitry in order to optimize the power provided to operate the EP and other loads. At the beginning of life (BOL) the SP provides greater peak power than at the end of life (EOL). The PMAD system peak power tracking unit (operating in continuous mode or discrete steps) lowers the voltage as the SP ages. However, the EP must always remain at a power level that is below the temporary maximum power, never at the maximum power, in order to preserve an operational stability margin to account for the unknown and unpredictable aging of the SP. Assume, for illustration sake that there are no other loads on the SP: the EP operating power point dictates the output power of the array which must be below the peak power point to provide for the operational stability margin. This means that the EP thruster does not get all the power it could get and hence the thrust is reduced and spacecraft transit/maneuver time is extended. In one prior attempt to improve solar powered spacecraft power system the power processor unit conditions the power output from the solar array and regulates the bus voltage and current so as to provide an output current applicable to be used on an arcjet thruster. U.S. Pat. No. 5,604,430. In another approach a power control circuit employs a multiplier, differentiator, detector, phase comparator and integrator to effect a ramp generator to produce minor variations in a beam current reference signal to an ion thruster. U.S. Pat. No. 4,143,314.

SUMMARY OF THE INVENTION

In accordance with various aspects of the subject invention in at least one embodiment the invention presents an improved solar powered spacecraft power system for Hall effect thruster which reduces power losses, size, weight and costs associated with the PMAD system and improves efficiency by operating the thruster(s) at the peak power point of the solar array power output despite aging degradation of the solar array.

The subject invention results from the realization that, in part, an improved solar powered spacecraft power system for a Hall effect thruster in various aspects can be achieved by connecting the electric propulsion system directly to the solar photovoltaic array without the PMAD system and further by periodically adjusting an operating parameter of the thruster to operate the thruster at the maximum available output power of the solar array.

The subject invention, however, in other embodiments, need not achieve all these objectives and the claims hereof should not be limited to structures or methods capable of achieving these objectives.

This invention features a solar powered spacecraft power system including a solar photovoltaic array, an electric propulsion system connected directly to the solar photovoltaic array, and a power management and distribution system connected to the solar photovoltaic array for distributing power to one or more bus loads and payloads.

In a preferred embodiment the solar photovoltaic array may include a number of solar panels. The electric propulsion system may include a Hall effect thruster. The electric propulsion system may include an electric propulsion thruster and a thruster power supply interconnected between the electric propulsion thruster and the solar photovoltaic array. The thruster power supply may include a d.c. to a.c. switching circuit connected to the solar photovoltaic array, a first rectifier connected to the electric propulsion thruster and a transformer with its primary interconnected with the switching circuit and its secondary interconnected with the first rectifier. The thruster power supply may include a d.c. to a.c. switching circuit connected to the solar photovoltaic array, a first rectifier connected to the electric propulsion thruster and a transformer with its primary interconnected with the switching circuit and a first winding of its secondary connected to the first rectifier and a second winding of its secondary connected to a second rectifier connected to the bus loads. The system may further include a battery system interconnected with the second winding of the secondary for charging the battery when the solar array is empowered and supplying power to the primary when the solar array is not empowered. The system may further include a battery system interconnected with the second winding of the secondary for charging when the solar array is empowered and supplying power to the primary when the solar array is not empowered, and supplying power to the bus loads and payloads; the second winding may include a second d.c. to a.c. switching circuit for transferring the battery power through the second winding to the first winding of the secondary to power the electric propulsion thruster. The electric propulsion system may include a Hall effect thruster and the thruster power supply may include a discharge power supply. The electric propulsion thruster may include a number of thrusters each powered by at least one of the thruster power supply sections. At least some of each the thruster power supply sections may be cross-strapped to one or more unassigned thrusters to provide redundant power sources.

This invention also features a solar powered spacecraft power system including a solar photovoltaic array, an electric propulsion system connected directly to the solar photovoltaic array in parallel with the spacecraft power system; the electric propulsion system including a Hall effect thruster, a thruster power supply for driving the thruster; a sensor for sensing the power output of the solar array and a controller responsive to the power output of the solar array and configured to periodically adjust an operating parameter of the thruster to operate the thruster at the maximum available output power of the solar array including comparing a previous solar array output power level with a later solar array output power level, and incrementing the operating parameter with a positive value if the later is greater and with a negative value if the later is lesser.

In a preferred embodiment the operating parameter may be mass flow rate of the propellant of the Hall thruster. The operating parameter may be the discharge voltage of the Hall thruster.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
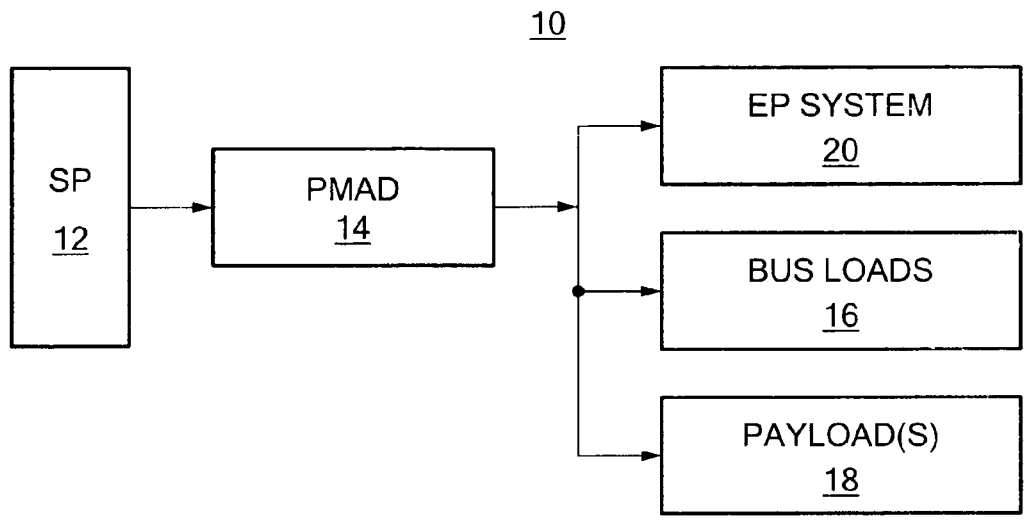
FIG. 1 is a schematic block diagram of a conventional, prior art solar powered spacecraft power system.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a conventional solar powered spacecraft power system 10. Power is generated by a solar photovoltaic array (SP) 12 and flows into the power management and distribution (PMAD) system 14. From there it is distributed to all the bus loads 16 and payload(s) 18. In modern spacecraft that use electric propulsion (EP) systems 20, the EP system 20 constitutes and additional load and can be a major load. A conventional PMAD system 14 may contain a peak power tracking or solar array shunt circuitry. There are a variety of possible PMAD implementations in the prior art. In the more sophisticated form, there is a DC/DC converter that outputs regulated bus voltage that is distributed throughout the bus to the EP system 20, bus load 16 and payload(s) 18 as well as the battery charger and batteries for energy storage which is used when the spacecraft is in eclipse and the SP delivers no power. When the spacecraft uses an EP system 20 that consumes a substantial portion of the SP 12 output this invention becomes very advantageous.

Figure 2:
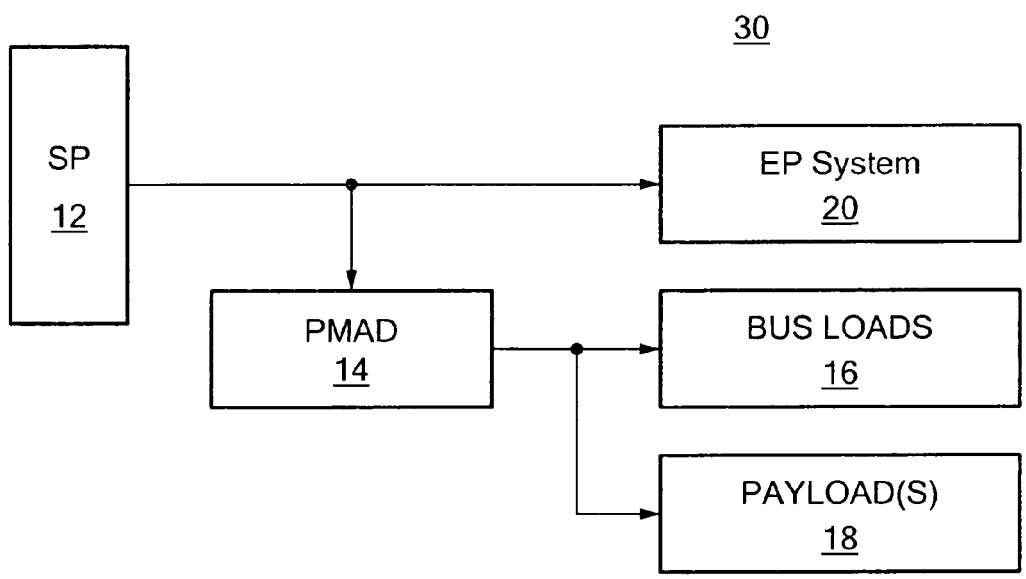
FIG. 2 is a schematic block diagram of a solar powered spacecraft power system for a Hall effect thruster according to one embodiment of this invention.

In accordance with one embodiment of this invention, FIG. 2, PMAD unit is removed from the power path to EP system 20 and the solar array SP 12 is connected directly to EP system 20. PMAD unit 14' is now much smaller. It handles much less power and therefore can be smaller resulting in mass and volume savings and because it processes less power it also has lower losses. The heat generated by these power losses in the PMAD must be rejected from the spacecraft to maintain its temperature within operating limits. Heat rejection equipment (radiators) are heavy with a specific mass of the order of 30 kg per kW of rejected heat. This lower loss or equivalently higher efficiency power processing not only results in a smaller array but also in smaller radiators, in both cases significantly reducing the spacecraft mass. EP system 20, FIG. 2, includes a thruster power supply and a Hall effect thruster. In a Hall effect thruster the thruster power supply is a discharge power supply (DPS).

Figure 3:
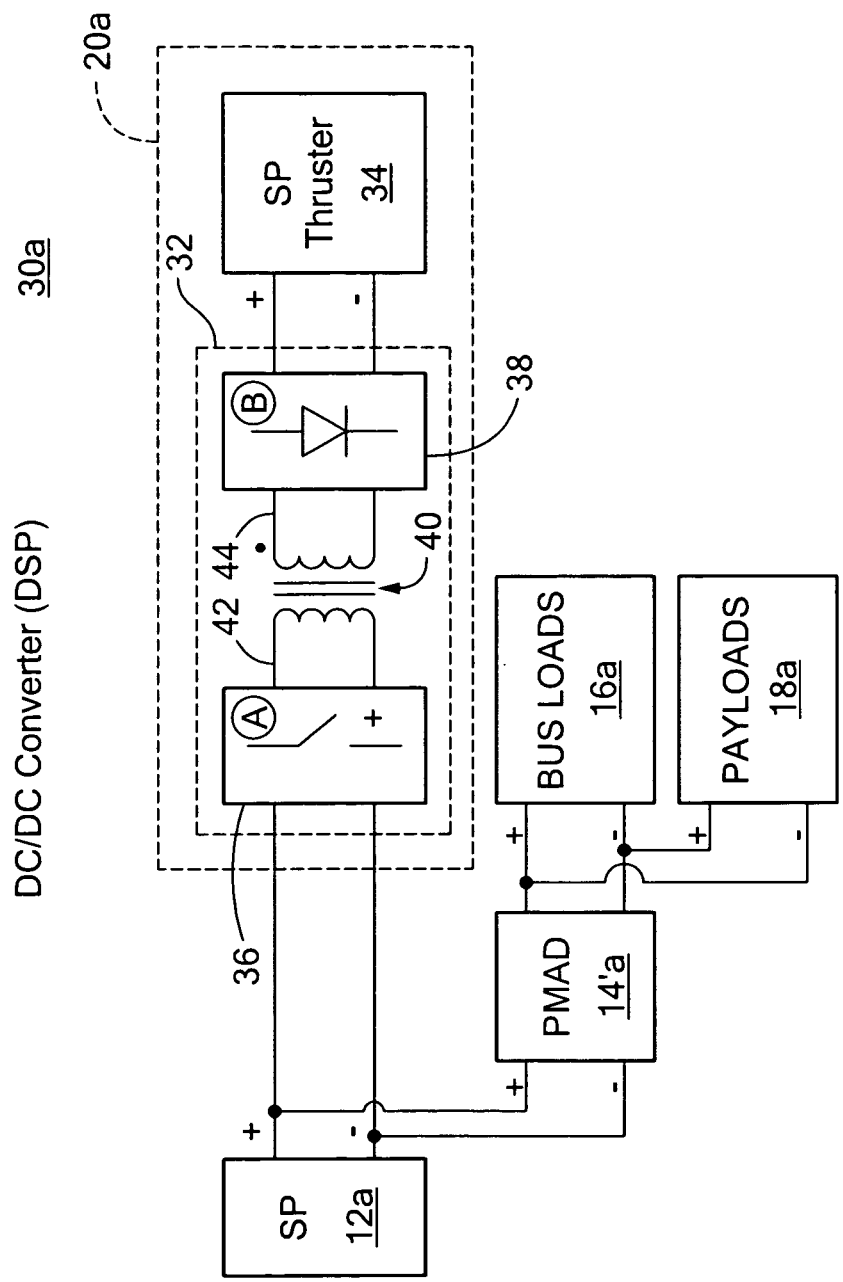
FIG. 3 shows in more detail the thruster power supply and electric propulsion thruster of the electric propulsion system of FIG. 2.

A more detailed diagram of the improved power system of FIG. 2, is shown in, FIG. 3. Here PMAD unit 14'a is in parallel with the Hall effect thruster power supply 32. EP system 20a includes a Hall effect thruster 34 and so thruster power supply 32 is implemented with a discharge power supply (DPS). DPS 32 is a DC/DC converter for driving the discharge of Hall effect thruster 34. Other portions of EP thruster 34, e.g. electromagnets, cathode heater, which will be discussed in more detail with respect to FIG. 8, consume a very small fraction of the power required for EP thruster 34. Typically DPS 32 processes more than 90% of the power for EP thruster 34. Thus these auxiliary supplies, e.g. cathode heater, etc. can be easily powered as other bus loads 16a with near zero impact on the system efficiency. Typically, bus load 16a also includes spacecraft communications, guidance, navigation and control (GNC), command and data handling (C & DH) etc. Thruster power supply, DPS 32 is configured as a DC/DC converter including a.c./d.c. switching circuit 36 and rectifier circuit 38. Transformer 40 interconnects switching circuit 36 and rectifier 38 switching circuit 36 is connected directly to solar panel 12a and to the primary winding 42 of transformer 40. Rectifier circuit 38 is interconnected with EP thruster 34 and is connected to the secondary winding 44 of transformer 40.

Figure 4:
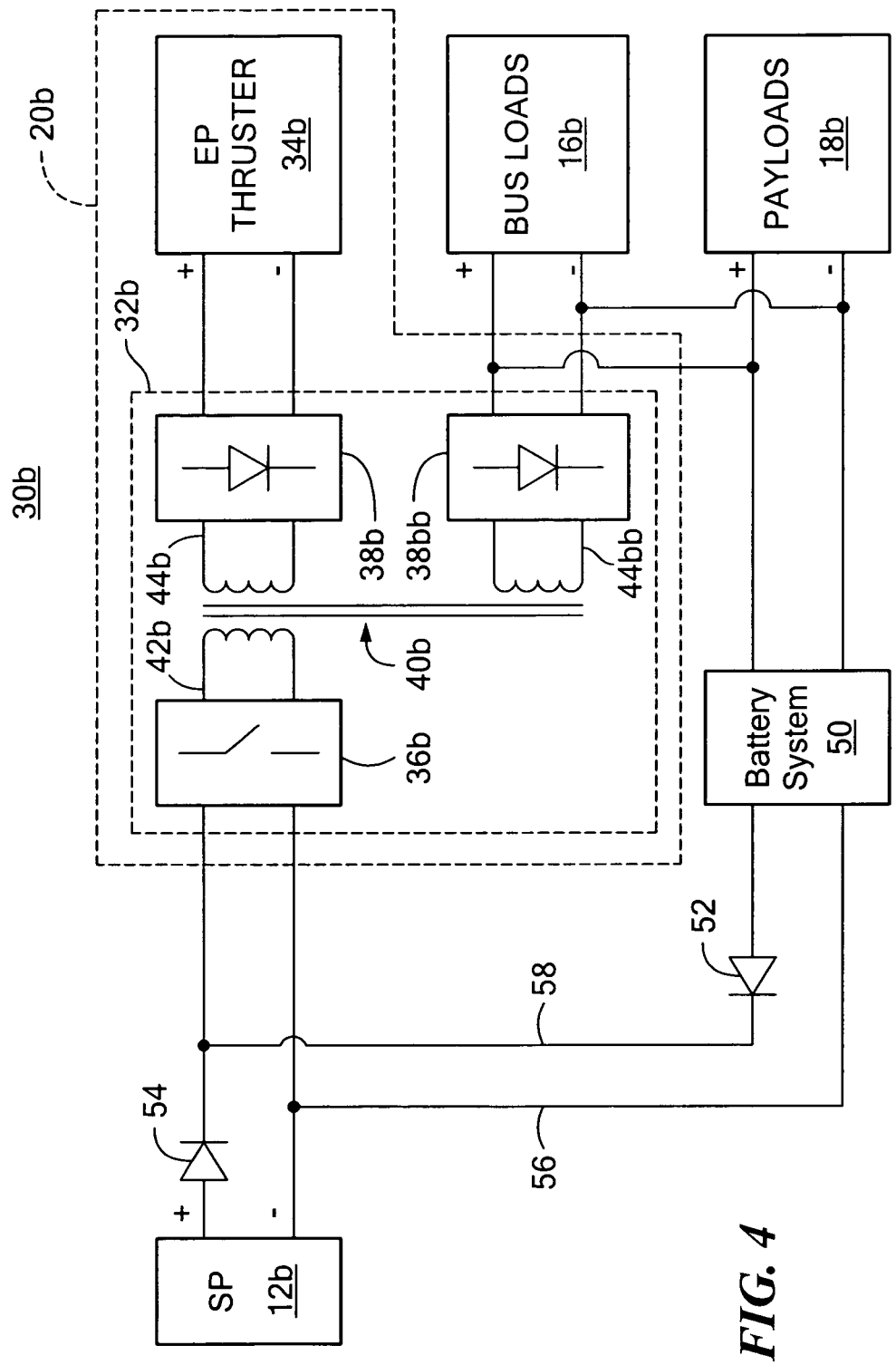
FIG. 4 shows another embodiment of a thruster power supply of FIG. 2.

Further improvement can be achieved by combining a portion of PMAD 14'a with DPS 32 into one DC/DC converter with two secondary windings on its transformer as shown in FIG. 4. Here transformer 40b includes two secondary windings 44b and 44bb, each of which is connected to a rectifier circuit 38b and 38bb. Rectifier 38b directly supplies EP thruster 34b so the EP system is directly connected to solar panel 12b. Second rectifier 38bb powered by second winding 44bb then drives bus loads 16b and payloads 18b. There is shown a battery system 50 including a battery and a charger circuit interconnected through diodes such as OR-ing diodes 52 and 54 to SP 12b. When SP 12b is providing power some of that power delivered through d.c./a.c. switching circuit 36*b* is transferred through transformer 40*b* to rectifying circuit 38*b* to power EP thruster 34*b*. But another portion of that is supplied through winding 44*bb* to second rectifier circuit 38*bb* the output of which powers not only bus loads 16*b* and payloads 18*b* but also charges battery system 50. Diode 54 blocks battery system 50 from back feeding to solar panel 12*b* and from any noise that may be produced by switching circuit 36*b*. When SP 12*b* is producing no power, e.g. it is eclipsed, battery system 50 provides power through diode 52 on lines 56 and 58 back through switching circuit 36*b*, and transformer 40*b* to supply rectifier circuit 38*b* which powers EP thruster 34*b* and to supply rectifier 38*bb* which powers bus loads 16*b* and payloads 18*b*.

Figure 5:
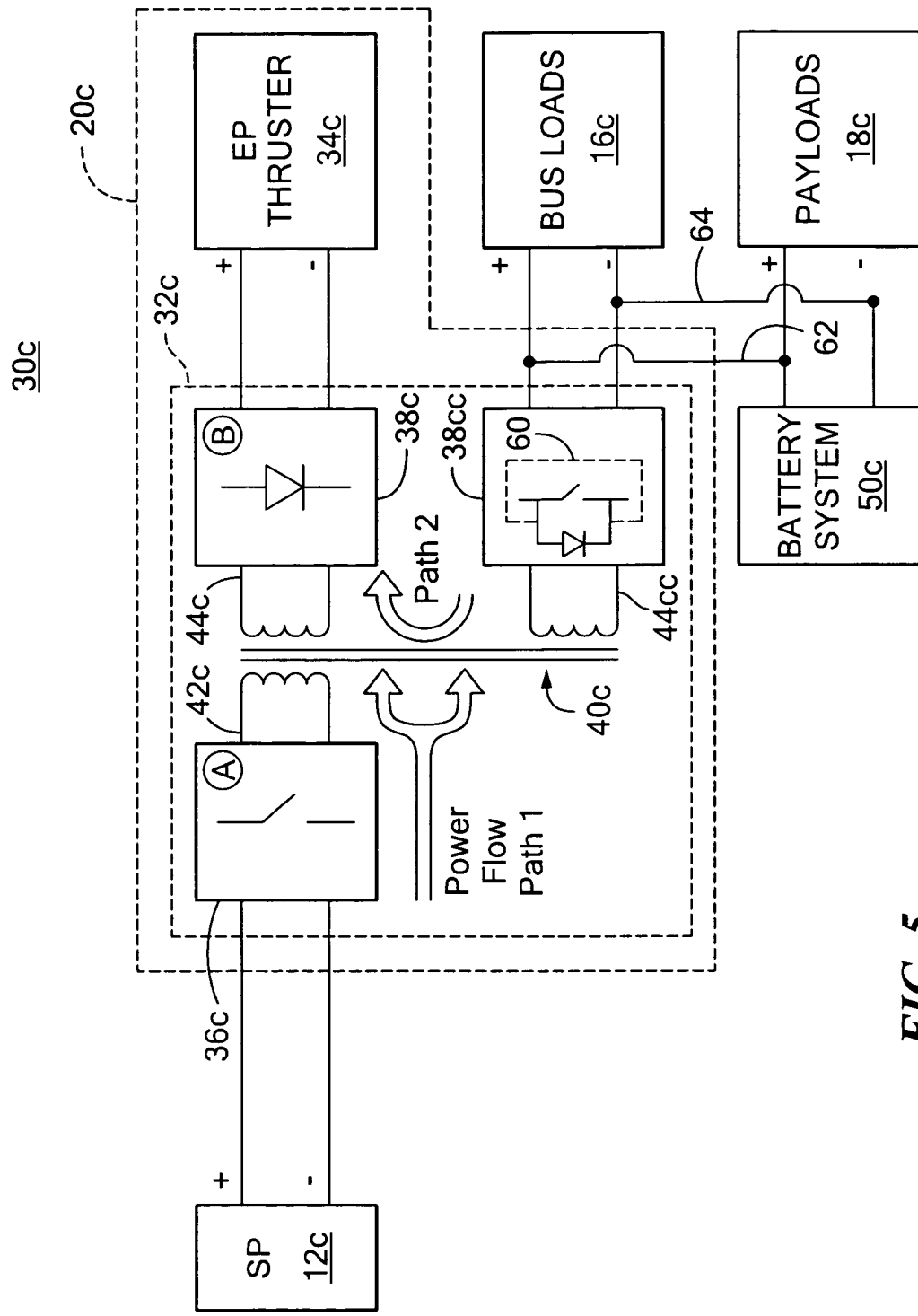
FIG. 5 shows another embodiment of a thruster power supply of FIG. 2.

An alternative to the use of the OR-ing diodes 52, 54 in FIG. 4, can be realized by making the DC/DC converter 32 of the DPS bi-directional as shown in FIG. 5. Here rectifier circuit 38*cc* includes an addition, a switching circuit 60. This implementation becomes attractive when the EP system power is comparable to the power consumed by the rest of the spacecraft. When the SP is active power flows via path 1 through from SP 12*c* to switching circuit 36*c* and from there through primary 42*c* of transformer 40*c* to first secondary winding 44*c* through rectifier 38*c* to EP thruster 34*c*. Likewise power flows through second winding 44*cc* of the secondary winding through rectifier circuit 38*cc* to supply bus loads 16*c*, payloads 18*c* and battery system 50*c*. Here, however, when the SP 12*c* is inactive battery power flows back through lines 62 and 64 to power bus loads 16*c* and payloads 18*c* and also through DC/DC converter switching circuit 60 to second winding 40*cc* where it is coupled through the transformer to first winding 44*c* and then through rectifier 38*c* to power thruster 34*c*.

Figure 7:
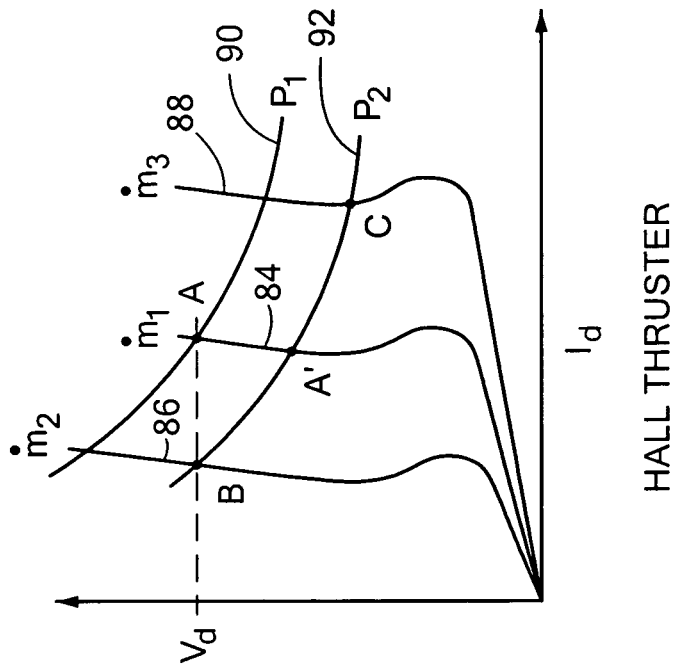
FIG. 7 illustrates the maximum power output characteristics of FIG. 6 and the V-I characteristics for a thruster at different mass flow conditions.
Figure 6:
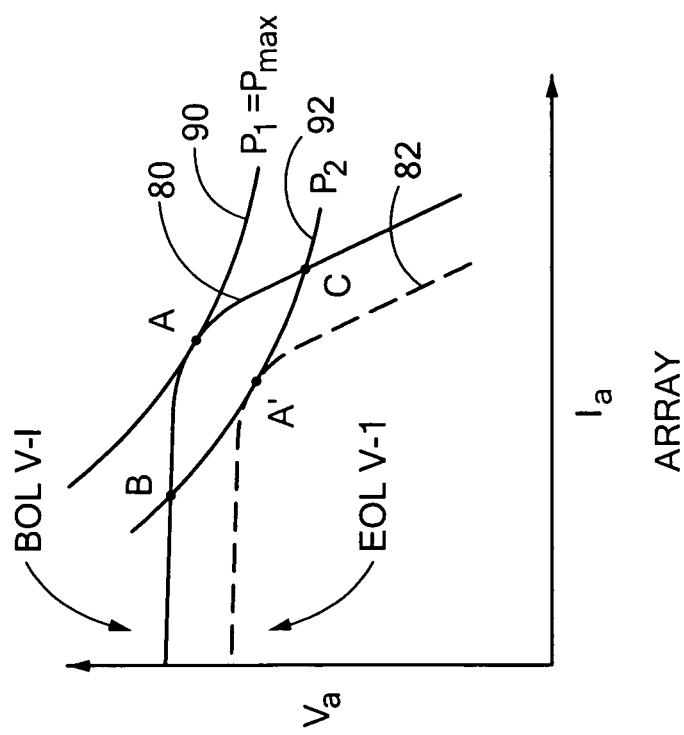
FIG. 6 illustrates V-I characteristics and maximum power output point for a solar array.

The thruster 34*b* has a broad operating range and can be used to operate the solar array SP 12 at peak power or off peak as needed. This eliminates the traditional peak power tracker employed in conventional PMAD systems. Connecting directly the main EP power supply or discharge power supply DPS in the case of a Hall thruster has other very important benefits in addition to reducing mass, losses and costs. These benefits are associated with regulation of the array in accordance with this invention as it ages and its output drops. Separate circuitry is normally used in conventional PMAD approaches. This invention, however, offers and elegant solution as described below. The way the EP systems can be used to maintain the SP at its peak power as it ages is illustrated in FIGS. 6 and 7. FIG. 6 shows typical photovoltaic solar array voltage current (V-I) characteristics 80, 82 while FIG. 7 shows typical Hall effect thruster voltage current characteristics with three different mass flows $m_1$ 84, $m_2$ 86, and $m_3$ 88. Also as shown in FIGS. 6 and 7 are identical constant power curves $P_1$ 90 and $P_2$ 92. At the beginning of life (BOL) the maximum power point of the solar array, FIG. 6, is at a point labeled A. Ignoring losses in the DPS the same power point is shown in the V-I characteristic of the typical Hall effect thruster in FIG. 7. The voltage and current values are different at each of the two A points but by energy conservation the power of $P_1$ in both points As must be the same (again ignoring losses in power processing). To maintain the array at point A, the array output $V_a$ and $I_a$ is measured and the Hall effect thruster DPS voltage setting or the mass flow rate of the propellant through the thrusters are adjusted such that the $V_a$, $I_a$ product is at a maximum. The following example assumes a fixed discharge voltage ($V_d$) set by the DPS and varying the mass flow. The opposite is an equally valid strategy where the mass is held constant and the voltage $V_d$ is varied or both $V_d$ and mass flow rate of the propellant can be varied subject to power conservation. That is, the operating parameter may be the mass flow rate of the propellant or the discharge or beam voltage. Assume then that initially the thruster is at point B (power equals $P_2$, voltage $V_D$, $\dot{m}=\dot{m}_2$). The control algorithm according to one embodiment of this invention that resides in the digital control interface unit (DCIU) described subsequently with respect to FIGS. 8 and 9 perturbs the mass flow to $\dot{m}_1$. This increases delivered power to $P_1$ and shifts the SP and EP to point A. The control algorithm does not know if maximum power was reached and increases the mass flow further to the value $\dot{m}_3$. However, the array cannot deliver higher power than $P_1$ and falls off the peak to $P_2$, a point labeled C. On the thruster side, the output must also drop to line $P_2$. The control algorithm then reduces the mass flow to $\dot{m}_1$ from $\dot{m}_3$ and returns the system to point A. Similar "peak power hunting" process can be carried out at any thruster discharge voltage. Thus using the EP to maintain the array at peak power not only benefits the array and PMAD but also ensures that the thrusters operate at the peak available power at any point in the mission. Because to first order a thruster delivers thrust linearly proportional to its input power maximum power corresponds to maximum thrust which reduces the maneuver time. Alternatively the thruster could be operated at higher specific impulse thus saving fuel.

A conventional PMAD which may contain a peak power tracker (that may be continuous or have discrete steps) lowers the voltage as the array ages. However, the EP system must always remain at a power level that is below the temporary maximum power, never at the maximum power to preserve margin for the unknown and unpredictable aging of the array. If one assumes for illustration sake that there are no other loads on the spacecraft power system, the EP operating set point dictates the output power of the array which must be at points B or C, FIGS. 6 and 7 even at BOL to provide the aforementioned margin. This means that the EP thruster does not get all the power it could get, and hence the thrust is reduced, and transit/maneuver time is extended. With the approach of this invention the EP is used to find the maximum power the array is capable of delivering and then setting the thruster to operate at that power. Thus, the array capability dictates the power to the thruster not the other way around.

Figure 8:
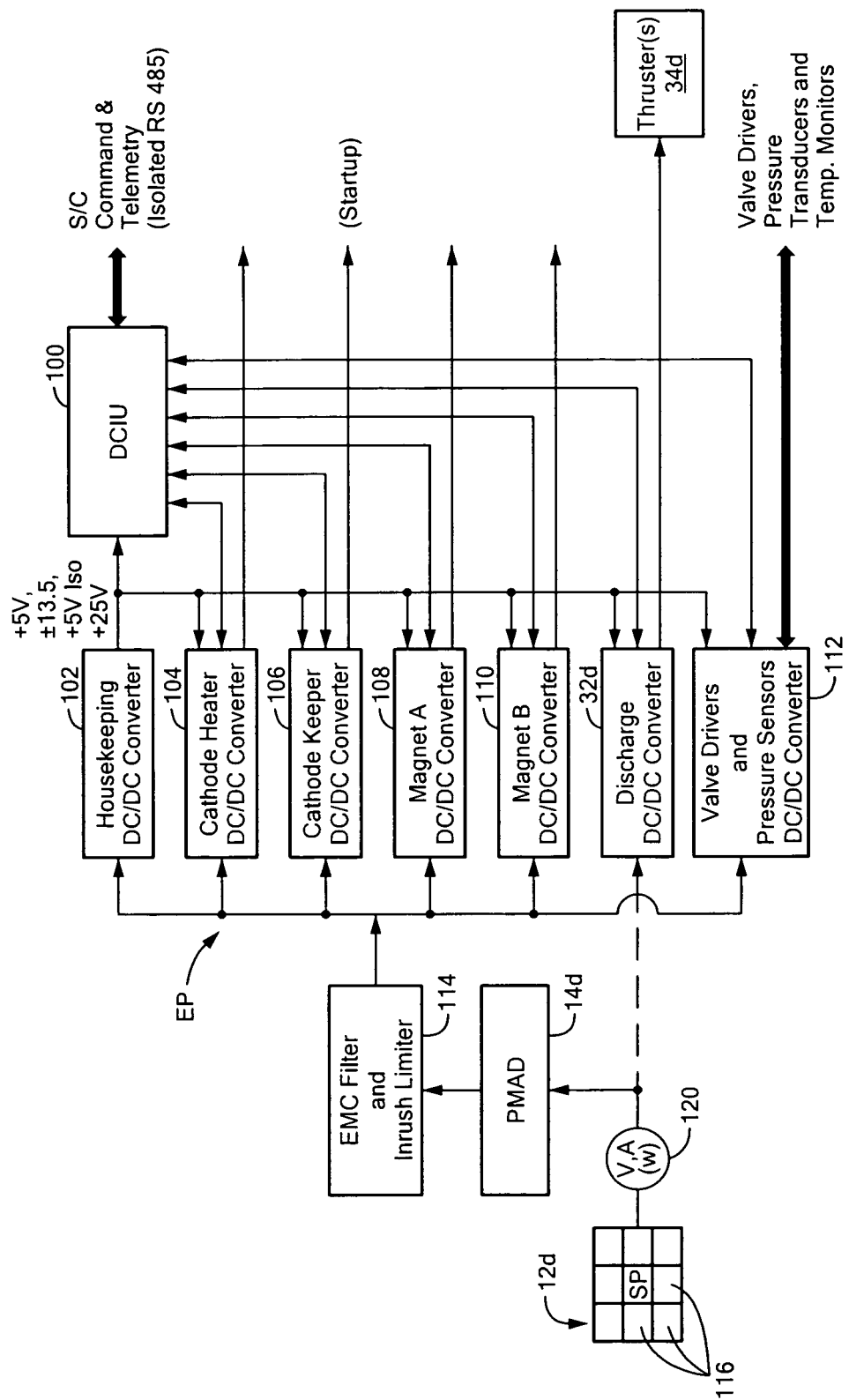
FIG. 8 is a schematic block diagram of an embodiment of an improved solar powered spacecraft power system according to this invention which operates the thruster at maximum available output power of the solar array accommodating for performance degradation.

In a typical EP system, the digital control interface unit (DCIU) sets the thruster operating points ($V_d$ and $I_d$–$\dot{m}$) DCIU 100, FIG. 8, receives digital commands from the spacecraft computer (S/C), and sends out analog set points for the various voltages/currents for each of the converters in FIG. 7. DCIU 100 includes typically a microprocessor or microcontroller, memory as well as analog to digital converters and digital to analog converters. The low converters servicing the typical Hall effect thruster include housekeeping DC/DC to converter 102, cathode heater DC/DC converter 104, cathode keeper DC/DC converter 106, magnet A DC/DC converter 108, magnet B DC/DC converter 110, valve driver and pressure sensor DC/DC converters 112, and discharge DC/DC converter 32*d*. In FIG. 8 PMAD 14*d* has associated with it an EMC filter and in rush limiter 114 which is a common approach to prevent backward reflection of converter switching noise and other unwanted signals. Also illustrated in FIG. 8 is the fact that solar photovoltaic array 12*d* need not be a single solar array but may be formed of a number of solar panels 116. By far the largest converter is the one associated with the thruster power supply discharge converter 32*d*, FIG. 8, which is why in the approach according to this invention the thruster power supply, DPS or discharge converter 32*d* is connected directly to the SP 12*d*. The spacecraft computer (S/C) typically will send a command to DCIU 100 to start the thruster and produce thrust for some period of time at a desired operating conditions (e.g. nominal $V_d$, $I_d$). DCIU 100 executes a series of instructions until the thruster reaches a desired operating point. With this invention, however, DCIU 100 receives an additional command to operate at maximum available power (e.g. to deliver maximum thrust at nominal $V_d$). DCIU 100 then drives the discharge converter 32*d* to hunt for maximum power from SP 12*d* or specific solar panels 116. In one implementation DCIU 100 may receive power readings directly from a watt-meter or volt times amp meter 120, FIG. 8, and calculate the set point for each DPS converter. This requires an additional algorithm in DCIU 100. Alternatively, each DPS converter may do its own processing to draw maximum power from the array segment. DCIU 100 then sums the output current from all DPS converters and alters the mass flow set point (valve position see converter 112) for the thruster that is fed by the group of converters. Depending upon the health of the various sections of solar panel, the individual converters may deliver substantially different power to the thruster while each section delivers the maximum it can.

Figure 9:
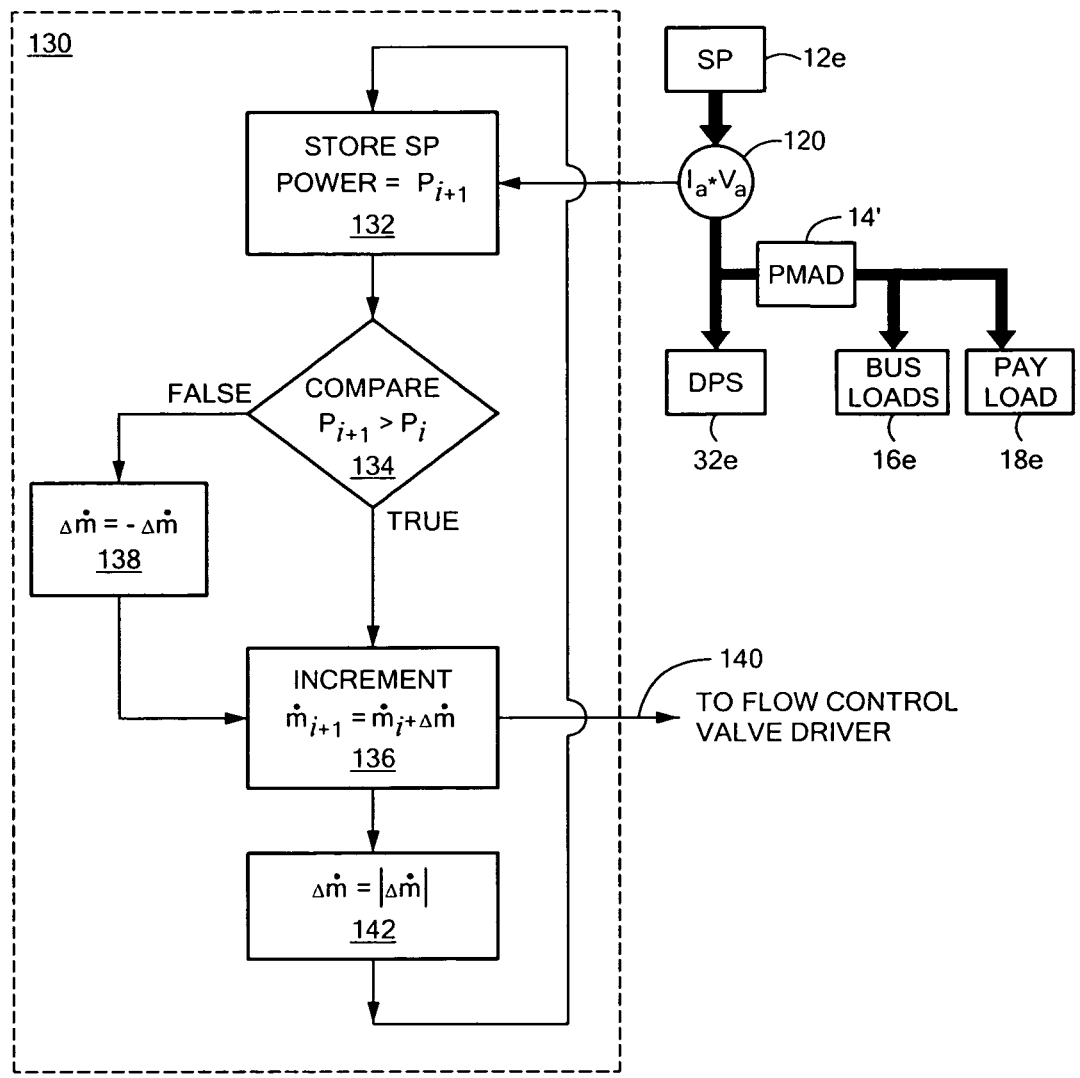
FIG. 9 is a flow diagram of the peak power hunting algorithm configuring the controller, of FIG. 6.

A maximum power algorithm 130, FIG. 9, according to one embodiment of this invention causes DCUI 100 to monitor the power at meter 120 and stores that value 132. The present sensed value $P_{i+1}$ is compared to the previous power $P_i$ at 134. If the present power reading $P_{i+1}$ is greater than the previous power reading $P_i$ then the system is incremented to a new mass flow $\dot{m}_{i+1}$ by adding a mass $\Delta m$ to the previous mass $\dot{m}_i$ 136. If $P_{i+1}$ is not greater than $P_i$ then 138 the $\Delta m$ increment is applied as a negative, that is $-\Delta m$. The instruction is sent on line 140 to the flow control valve driver 112 and the absolute value of $\Delta m$ is forwarded 142. The loop speed for this adjustment need not be extremely high, adjustment even every few minutes may be found sufficient.

Note that the maximum power algorithm, FIG. 9, is uninformed of the power processed by the DPS 32*e* or the power processed by the PMAD 14', the former being consumed by the hall thruster plasma discharge and the latter by the bus loads plus the payload. The only requirement is that their sum must be equal to the product Ia*Va (120), again ignoring losses in the power processing. The SP, 12*e*, power output (=Ia*Va) can be changing and the bus load and the payload, 18*e*, can also be changing while the algorithm automatically accommodates these simultaneous changes by directing the excess power to the DPS, 32*e*, always giving priority to the bus and payload power needs. This can be explained by the following example. Suppose that that the EP is off (consumes no power) and the bus plus the payload consumes power P2 as shown in FIG. 6. At BOL, the operating point of the array then must be at either point B or C. Then the EP thruster is commanded to start at first at very low power which it gradually increases using the algorithm in FIG. 9. This will be shifting the power produced by the array toward P1 and point A. If suddenly, the bus load demands more power, the SP cannot supply it and the algorithm in FIG. 9 reduces the SP power by reducing the power to the EP thruster. In this manner, the EP thruster continually drives the SP to maximum power point while automatically satisfying the power demand by the bus load and the payload.

Figure 10:
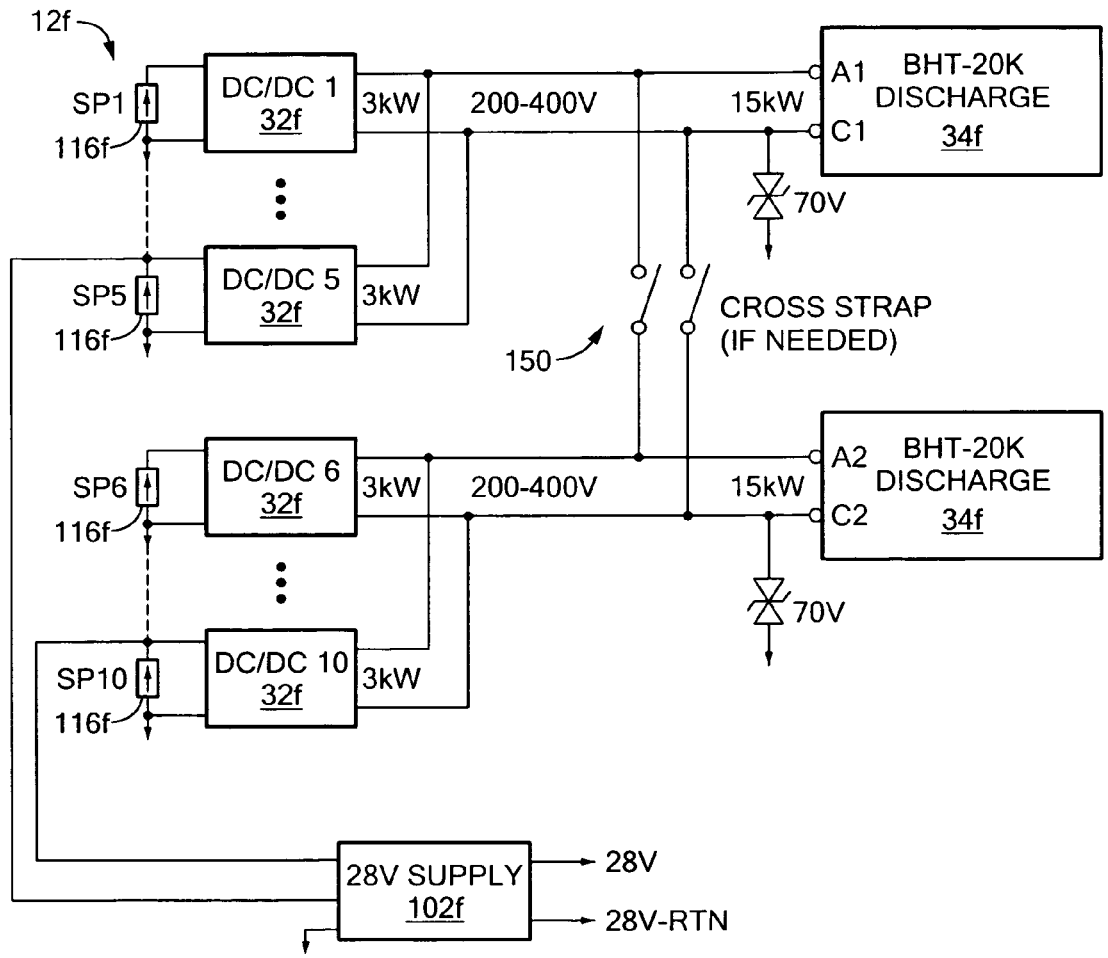
FIG. 10 is a schematic block diagram of a thruster power supply consisting of a number of thruster power supply sections configured in subsets to serve one or a plurality of thrusters and provide redundant back-up.

So far, simple block diagrams have been used to describe the invention but large high power spacecraft can be much more complicated. For example as shown in FIG. 10 the improved power system of this invention for a high power spacecraft may have 30 kW of power on board. The solar array 12*f* may include ten solar panels 116*f*. Each panel is connected to a discharge power supply DC converter 32*f*. The outputs of five of the converters are paralleled and feed 15 kW Hall thruster 34*f*. The other five converters 32*f* deliver power to a second Hall thruster 34*f*. If needed the outputs can be cross-strapped such as by switches 150 such that either thruster 34*f* can be connected to either set of the five converters 32*f* and their respective arrays 116*f*. This is desirable for redundancy. Power for the rest of the bus and payloads may be delivered through a separate low power DC/DC converter that outputs the conventional 28 volts. This converter can be fed from one or more of the solar panels 116*f* or may have its own solar panel in the solar array.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A solar powered spacecraft power system comprising:
    a solar photovoltaic array;
    an electric propulsion system including a thruster and thruster power supply connected directly to said solar photovoltaic array, creating a power path between the solar photovoltaic array and the electric propulsion system, the electric propulsion system including an operating point which can be continually and automatically adjusted to maintain the solar photovoltaic array at peak power; and
    a power management and distribution system connected to said solar photovoltaic array and in parallel with the electric propulsion system, said power management and distribution system removed from said power path and connected to one or more busloads and payloads for distributing power to the one or more bus loads and payloads.

2. The solar powered spacecraft power system of claim 1 in which said solar photovoltaic array includes a number of solar panels.

3. The solar powered spacecraft power system of claim 1 in which said electric propulsion system includes a Hall effect thruster.

4. The solar powered spacecraft power system of claim 1 in which said thruster power supply includes a d.c. to a.c. switching circuit connected to said solar photovoltaic array, a first rectifier connected to said electric propulsion thruster and a transformer with its primary interconnected with said switching circuit and its secondary interconnected with said first rectifier.

5. The solar powered spacecraft power system of claim 1 in which said thruster power supply includes a d.c. to a.c. switching circuit connected to said solar photovoltaic array, a first rectifier connected to said electric propulsion thruster and a transformer with its primary interconnected with said switching circuit and a first winding of its secondary connected to said first rectifier and a second winding of its secondary connected to a second rectifier connected to said bus loads.

6. The solar powered spacecraft power system of claim 5 further including a battery system interconnected with said second winding of said secondary for charging the battery when said solar array is empowered and supplying power to said primary when said solar array is not empowered.

7. The solar powered spacecraft power system of claim 5 further including a battery system interconnected with said second winding of said secondary for charging when said solar array is empowered and supplying power to said primary when said solar array is not empowered, and supplying power to said bus loads and payloads, said second winding including a second d.c. to a.c. switching circuit for transferring said battery power through said second winding to said first winding of the secondary to power said electric propulsion thruster.

8. The solar powered spacecraft power system of claim 1 in which said electric propulsion system includes a Hall effect thruster and said thruster power supply includes a discharge power supply.

9. The solar powered spacecraft power system of claim 8 in which said electric propulsion thruster includes a number of thrusters each powered by at least one of said thruster power supply sections.

10. The solar powered spacecraft power system of claim 9 in which at least some of each said thruster power supply sections are cross-strapped to one or more unassigned thrusters to provide redundant power sources.

11. A solar powered spacecraft power system comprising:

a solar photovoltaic array which outputs a voltage and a current;

an electric propulsion system connected directly to said solar photovoltaic array in parallel with the spacecraft power system; said electric propulsion system including a Hall effect thruster, a thruster power supply implemented with a discharge power supply for driving said thruster; a sensor for sensing the power output of said solar array; and a controller responsive to measured mass flow rate of said thruster or to discharge voltage set by the discharge power supply, said controller configured to adjust the mass flow rate or discharge power supply voltage setting such that a product of said voltage and current outputs is at a maximum to operate said thruster at the maximum available output power of said solar array.

12. The solar powered spacecraft power system of claim 11 in which said mass flow rate is the mass flow rate of propellant of the said Hall thruster.

* * * * *